US007526556B2

(12) United States Patent
Banerjee et al.

(10) Patent No.: US 7,526,556 B2
(45) Date of Patent: Apr. 28, 2009

(54) METHOD AND APPARATUS FOR MANAGING KEEPALIVE TRANSMISSIONS

(75) Inventors: Dwip N. Banerjee, Austin, TX (US); Vinit Jain, Austin, TX (US); Vasu Vallabhaneni, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 944 days.

(21) Appl. No.: 10/607,460

(22) Filed: Jun. 26, 2003

(65) Prior Publication Data
US 2004/0264381 A1    Dec. 30, 2004

(51) Int. Cl.
G06F 15/16    (2006.01)
G06F 15/173    (2006.01)

(52) U.S. Cl. .................. 709/227; 709/228; 709/230; 709/223; 709/224

(58) Field of Classification Search ......... 709/227–229, 709/223–224, 230
See application file for complete search history.

(56) References Cited

U.S. PATENT DOCUMENTS

| | | | | |
|---|---|---|---|---|
| 4,009,415 | A * | 2/1977 | Ngo ............................ | 345/215 |
| 4,635,187 | A * | 1/1987 | Baron et al. ................. | 718/100 |
| 6,212,175 | B1 * | 4/2001 | Harsch ........................ | 370/338 |
| 6,385,447 | B1 * | 5/2002 | Soleimani et al. ........... | 455/427 |
| 6,405,262 | B1 * | 6/2002 | Vogel et al. ................. | 719/315 |
| 6,967,927 | B1 * | 11/2005 | Dugeon et al. ............ | 370/236.1 |
| 6,981,048 | B1 * | 12/2005 | Abdolbaghian et al. ..... | 709/228 |
| 7,152,111 | B2 * | 12/2006 | Allred et al. ................ | 709/227 |
| 7,167,926 | B1 * | 1/2007 | Boucher et al. ............. | 709/250 |
| 2001/0043561 | A1 * | 11/2001 | Burns et al. ................. | 370/216 |
| 2003/0009561 | A1 * | 1/2003 | Sollee ........................ | 709/227 |
| 2003/0067926 | A1 * | 4/2003 | Golikeri et al. ............. | 370/401 |
| 2003/0084161 | A1 * | 5/2003 | Watson et al. ............... | 709/227 |
| 2003/0172169 | A1 * | 9/2003 | Cheng ........................ | 709/230 |
| 2003/0208600 | A1 * | 11/2003 | Cousins ..................... | 709/227 |
| 2003/0212801 | A1 * | 11/2003 | Yang-Huffman ........... | 709/228 |
| 2004/0062267 | A1 * | 4/2004 | Minami et al. .............. | 370/463 |
| 2004/0136358 | A1 * | 7/2004 | Hind et al. .................. | 370/352 |
| 2004/0250059 | A1 * | 12/2004 | Ramelson et al. .......... | 713/150 |
| 2005/0002400 | A1 * | 1/2005 | Karol et al. ................. | 370/394 |

OTHER PUBLICATIONS

Kompella et al. Link bundling in MPLS traffic engineering. Mar. 2002. http://www1.tools.ietf.org/html/draft-ietf-mpls-bundle-00.*

(Continued)

*Primary Examiner*—Hieu T Hoang
(74) *Attorney, Agent, or Firm*—Yee & Associates, P.C.; Matthew W. Baca

(57) ABSTRACT

A method, apparatus, and computer instructions for managing keepalive transmissions. A keepalive packet is received from a remote data processing over a particular connection within a set of connections to the remote data processing system. Timers for each of the set of connections are reset in response to receiving a response to a keepalive packet from the remote data processing system such that only a single keepalive packet is required to maintain all of the plurality of connections with the remote data processing system. In this manner, the number of requests and responses with respect to whether a connection is active is minimized, reducing congestion in a network data processing system.

8 Claims, 5 Drawing Sheets

OTHER PUBLICATIONS

Lang et al. Link management protocol (LMP). Chapters 1-6. Jul. 2002. http://tools.ietf.org/html/draft-ietf-ccamp-lmp-00.*
Stevens. TCP/IP Illustrated, vol. 1, pp. 331-333, Addison Wesley, 1994.*

Lucas, "FreeBSD's Sysctl Interface (Industry Trend or Event)", Sys Admin, vol. 9, Sep. 2000, p. 16.

* cited by examiner

METHOD AND APPARATUS FOR MANAGING KEEPALIVE TRANSMISSIONS

BACKGROUND OF THE INVENTION

1. Technical Field

The present invention relates generally to an improved data processing system and in particular to a method and apparatus for processing data. Still more particularly, the present invention relates to a method, apparatus, and computer instructions for managing keepalive transmissions sent between two computers in the TCP/IP protocol.

2. Description of Related Art

In a network, data is transferred between various nodes on the network. These nodes include, for example, client and server computer systems. A server is a service on a network that is shared by multiple clients. A server may refer to both hardware and software or just the software that performs the service. A client is a computer system that accesses a server to obtain services. One set of protocols that is used to handle communications between different computer systems on a network is the Transmission Control Protocol (TCP)/Internet Protocol (IP). TCP provides transport functions to ensure that the total amount of bytes sent is received correctly at the other end. IP is used to accept packets from TCP and adds a header to deliver the packet to a data link layer protocol. An IP address is used by every client and server in the network to send data between the different systems.

A server will often times maintain connections with many clients located on different machines. A keepalive mechanism is implemented in the TCP protocol to convey status information to a connected peer system, such as a server. This mechanism is used to determine whether another computer system is alive or running. Such a mechanism is especially useful in the case in which the computer system at one end of the connection is powered off or rebooted. When a keepalive packet is received thereafter, a reset is sent by the system that was rebooted or powered off and the connection is terminated when the server receives this response. Without such a mechanism, connections are maintained indefinitely even when the other end has been rebooted.

Currently, each connection has its own keepalive mechanism that is used for the particular connection. The present invention recognizes that such a mechanism is wasteful of resources on computer systems, such as server machines which have multiple connections with the same client. For example, a proxy and a back-end server may have multiple connections between these systems. If each connection generates a keepalive packet, the number of packets that is transferred between a server machine and client machines may reach large numbers. For example, a server process on a server computer may maintain thousands of connections with different client computers. In many cases, a keepalive packet is sent about every two hours. As a result, many packets may be sent every second to maintain all of these connections. Such a large scale sending of packets is unnecessary when a large number of connections are between the same two computer systems.

Therefore, it would be advantageous to have an improved method, apparatus, and computer instructions for managing keepalive transmissions.

SUMMARY OF THE INVENTION

The present invention provides a method, apparatus, and computer instructions for managing keepalive transmissions. A keepalive packet is received from a remote data processing system over a particular connection within a set of connections to the remote data processing system. Timers for each of the set of connections are reset in response to receiving a response to a keepalive packet from the remote data processing system such that only a single keepalive packet is required to maintain all of the plurality of connections with the remote data processing system. In this manner, the number of requests and responses with respect to whether a connection is active is minimized, reducing congestion in a network data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
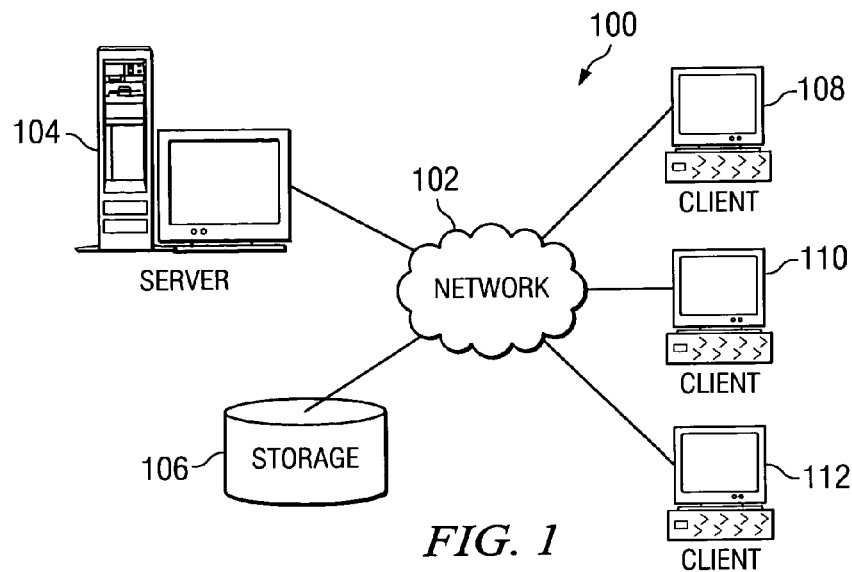
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
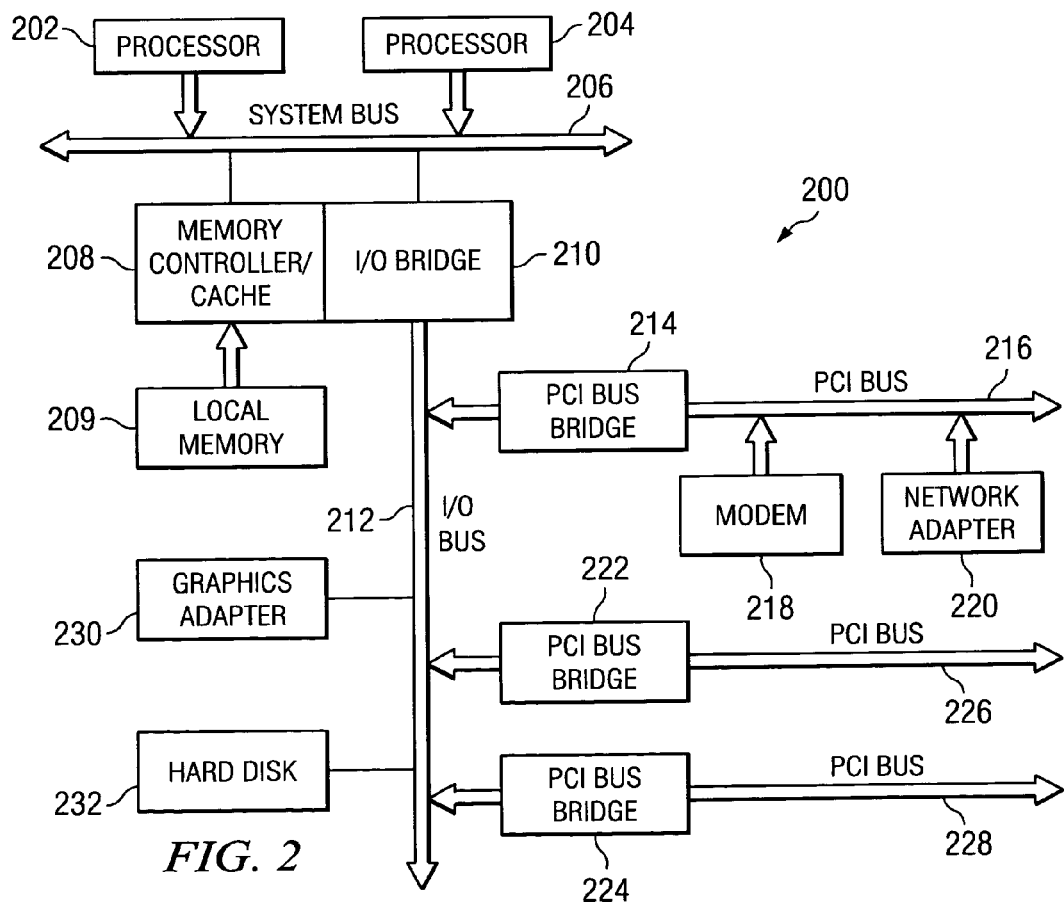
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards. Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
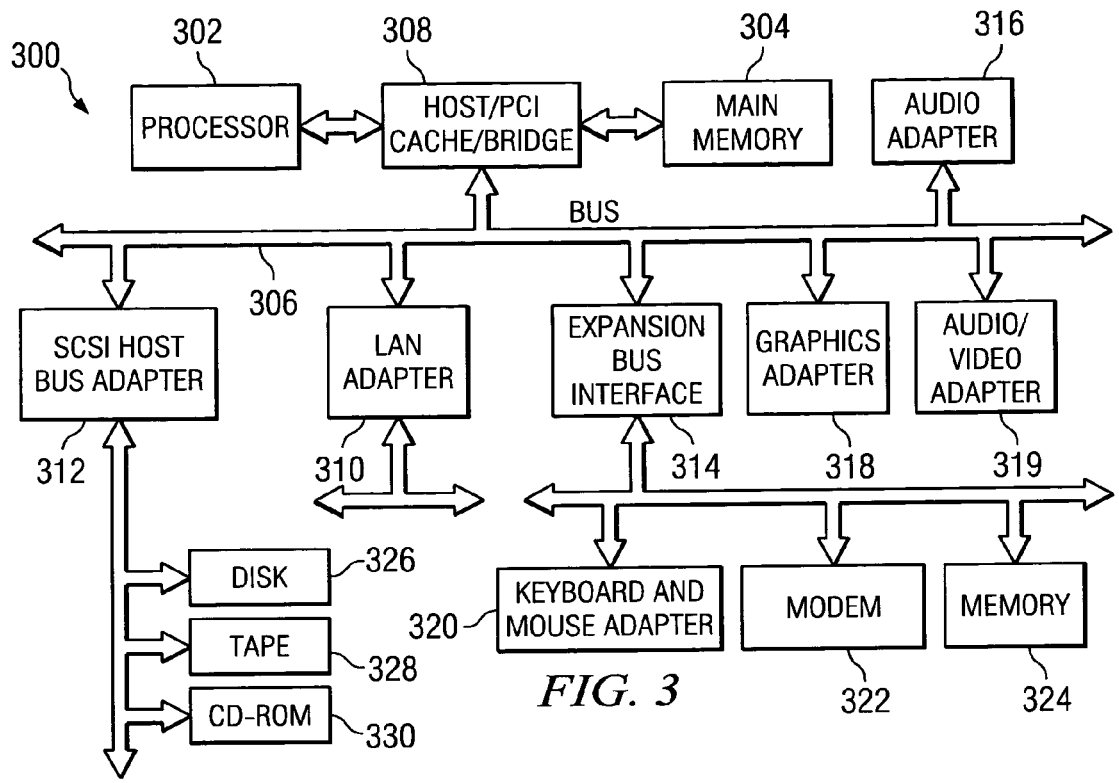
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces. As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for minimizing the amount of packets or other data transferred between computer systems using a keepalive mechanism. The present invention gathers keepalive information by sending a keepalive packet on one connection in a set of connections between two computer systems. The return information is used to reset keepalive timers for all of the connections between two computer systems. The connection selected for use in sending the keepalive packet may be selected according to a policy. For example, the policy may use a round robin scheme to determine which connections are used to send keepalive packets. Additionally, the present invention may use any message on any connection between the two computer systems as a keepalive response to maintain timers based on those messages.

Figure 4A:
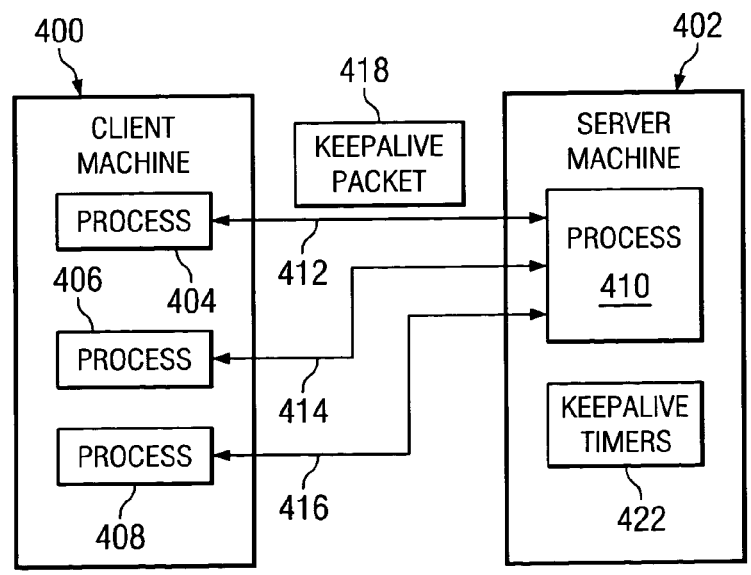
FIGS. 4A-4C are diagrams illustrating data flow in managing keepalive transmissions in accordance with a preferred embodiment of the present invention.
Figure 4B:
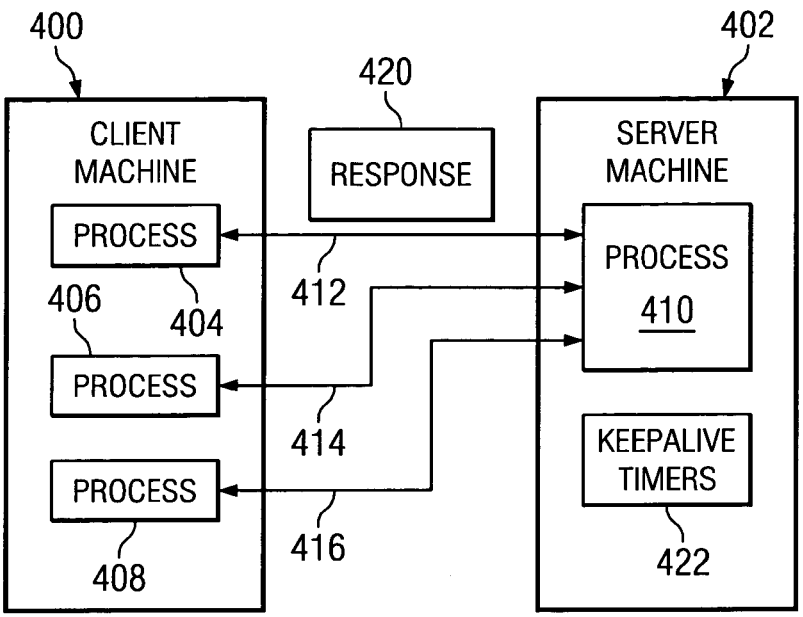
Figure 4C:
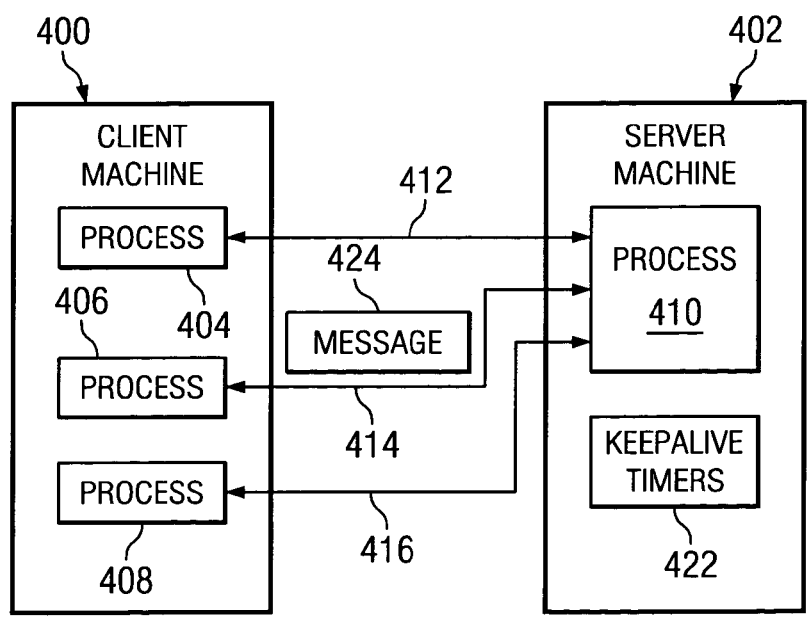

Turning now to FIGS. 4A-4C, diagrams illustrating data flow in managing keepalive transmissions are depicted in accordance with a preferred embodiment of the present invention. Client machine 400 is a client to server machine 402 as illustrated in FIG. 4A. Client machine 400 may be implemented using a data processing system, such as data processing system 300 in FIG. 3, while server machine 402 may be implemented using a data processing system, such as data processing system 200 in FIG. 2.

Client machine 400 includes process 404, process 406, and process 408. These processes have connections to process 410 on server machine 402. In particular, process 404 uses connection 412, process 406 uses connection 414, and process 408 uses connection 416 to connect to server machine 402. As illustrated in this example, process 410 sends a keepalive packet to process 404 over connection 412.

Typically, process 410 will send a keepalive packet, such as keepalive packet 418, to each of the processes on client machine 400. With the mechanism of the present invention, only a single keepalive packet, keepalive packet 418, needs to be sent to client machine 400. In this example, process 404 in client machine 400 returns response 420, in FIG. 4B, to process 410 at server machine 402 over connection 412. If response 420 is an acknowledgement of keepalive packet 418, keepalive timers 422 are reset. As described above, keepalive timers 422 are a set of timers for connections 412, 414, and 416 in client machine 400. In accordance with a preferred embodiment of the present invention, response 420 results in timers being reset for all of the connections to client 400.

Additionally, messages also may be used to reset keepalive timers 422. As illustrated in FIG. 4C, process 406 in client machine 400 sends message 424 to process 410 in server machine 402 over connection 414. This may be part of the normal TCP data exchange between the processes on the client and the server. Receipt of message 424 by process 410 also is used to reset timers 422 for connections 412, 414, and 416.

In these examples, all of these connections are identified as being to the same client, client machine 400, based on the IP address for the connections. This is the IP address used during connection setup between the client and the server and may be obtained as part of a DNS lookup or other means. The destination and source IP addresses are kept as part of the connection maintenance infrastructure in entities called protocol control blocks (PCBs). Thus, connections between same pairs of machines can be easily identified using the matching source and destination IP addresses. Further, if a client has multiple IP addresses through the use of different network adapters, the machine may be identified as a common machine through additional information sent during a request to set up a connection. For multi-homed machines, it is possible to either use reverse DNS lookup to find out if two IP addresses have the same host name or to use routing protocol support to find out if a machine is multi-homed and if the machine uses the two IP addresses in question. A multi-homed machine is a data processing system with more than one IP address.

If response 420 is an acknowledgement to the keepalive packet, keepalive timers 422 are reset. Response 420 may contain other types of responses, such as a reset (RST) response, which indicates that no connection should be present because the machine has been rebooted or powered off previously. Additionally, if no response is received after a selected period of time, another keepalive packet may be sent. This retry may be attempted some selected number of times, such as three. Thereafter, the connection is assumed to be down or failed. In these examples, all of the connections to the same machine will be terminated if one of the connections is determined to be down or failed.

In this manner, network efficiency is improved by reducing congestion and keeping more up-to-date keepalive information. Such a mechanism is also especially useful for clients in countries in which clients pay on a per-packet basis for the transmission of data. By coalescing, sharing, and maintaining more current information, keepalive costs are reduced for these situations.

For example, if two machines have a hundred established connections with a keepalive interval of two hours for each connection, a keepalive packet is sent every 1.2 minutes. In contrast, with the mechanism of the present invention, if each of these connections sends out a keepalive packet every 20 hours, a packet will be exchanged between the two machines every 12 minutes. This interval provides more fine-grained update information for the connections while reducing the number of packets.

The depicted examples illustrate the processes of the present invention with respect to a client/server system. These examples are presented for purposes of illustrating a preferred embodiment of the present invention. The mechanism of the present invention also may be applied to other types of systems, such as a peer-to-peer system.

Figure 5:
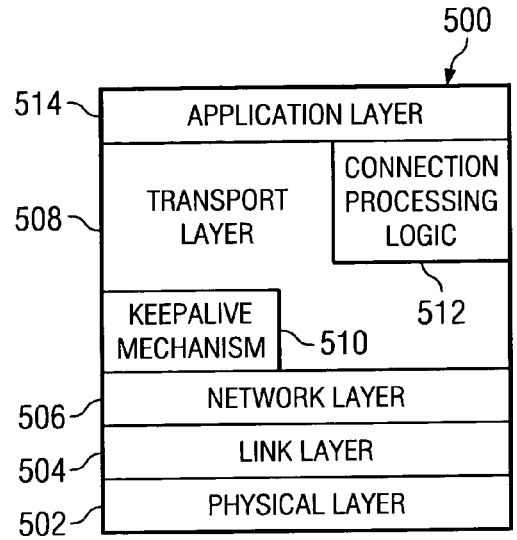
FIG. 5 is a diagram of a TCP/IP stack in accordance with a preferred embodiment of the present invention.

Turning now to FIG. 5, a diagram of a TCP/IP stack is depicted in accordance with a preferred embodiment of the present invention. Stack 500 is found in a data processing system, such as client machine 400 or server machine 402 in FIG. 4A. In this example, stack 500 contains physical layer 502, link layer 504, network layer 506, transport layer 508, and application layer 510.

Physical layer 502 is responsible for passing bits onto and receiving them from the connecting medium. This layer has no understanding of the meaning of the bits, but deals with the electrical and mechanical characteristics of the signals and signaling methods. The network interface layer is used to route data between devices on the same network. Further, this layer manages the exchange of data between the network and other devices in a client machine. Next, link layer 504 is responsible for handling packets at the link level, such as between different nodes. Network layer 506 establishes the route between the sending and receiving stations. The node to node function of the link layer 504 is extended across the entire internetwork, because a routable protocol contains a network address in addition to a station address. In particular, IP addresses are handled by network layer 506.

Transport layer 508 contains TCP. Further, keepalive mechanism 510 and connection processing logic 512 are located in transport layer 508. Keepalive mechanism 510 included the processes of the present inventions with respect to the handling of keepalive timers as described in FIG. 4a and FIG. 4b. Connection processing logic 512 manages the sending and response to keepalive packets sent by keepalive mechanism 510. Connection processing logic 512 is called by application layer 514 and instructs the TCP in transport layer 508 to establish a connection.

In handling responses to keepalive packets, connection processing logic 512 resets all of the timers handled by keepalive mechanism 510 for connections to the same client machine in response to the receipt of a response to an acknowledgement keepalive packet being sent for one of the connections. Further, connection processing logic 512 also may use any message sent on any of the connections to the same client machine as keepalive information that is used to reset the timers. The keepalive mechanism is typically employed in a server machine, but also may be used in client machines depending upon the particular implementation.

Figure 6:
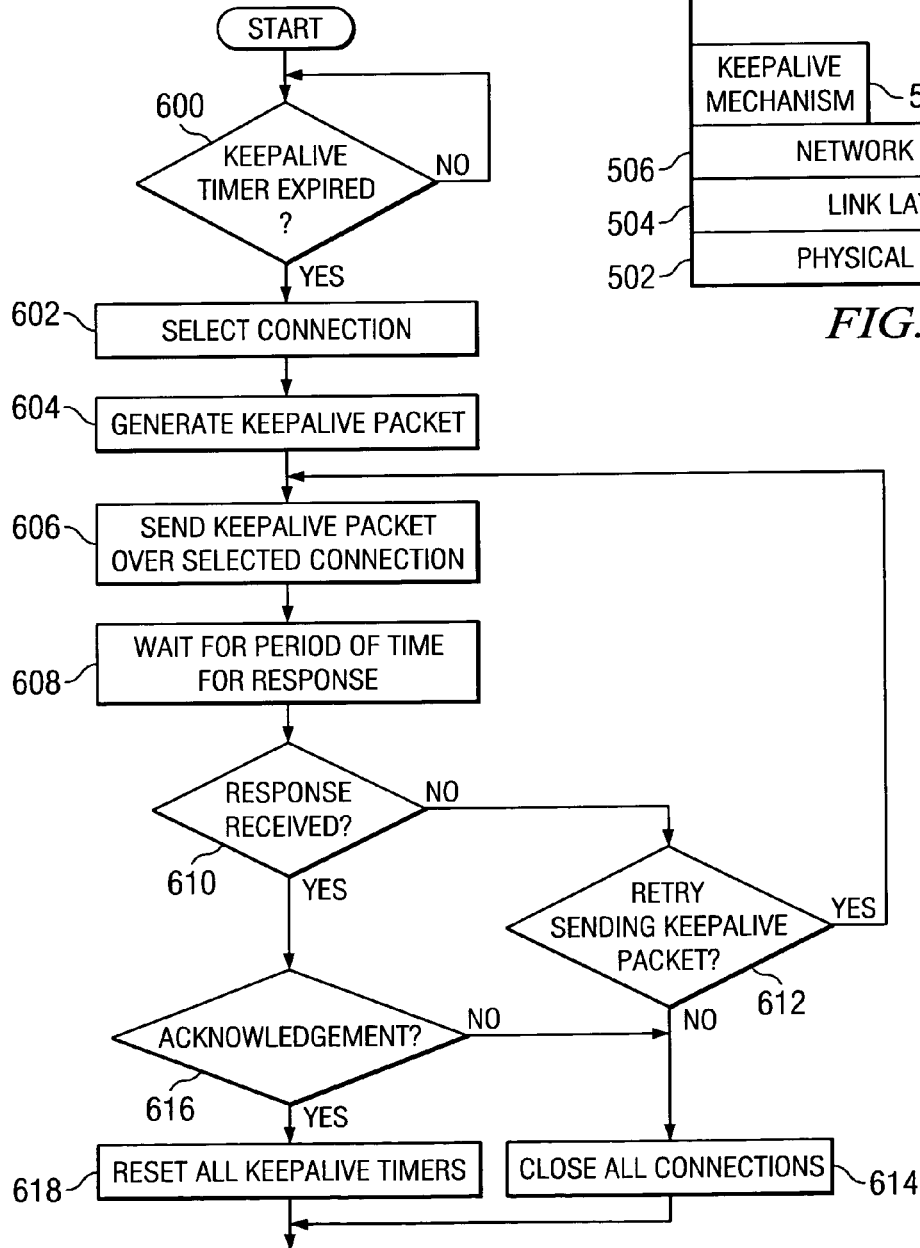
FIG. 6 is a flowchart of a process for managing transmission of keepalive packets for a set of connections in accordance with a preferred embodiment of the present invention.

Turning next to FIG. 6, a flowchart of a process for managing transmission of keepalive packets for a set of connections is depicted in accordance with a preferred embodiment of the present invention. The process illustrated in FIG. 6 may be implemented in a connection process, such as connection process 510 in FIG. 5.

The process begins by determining whether a keepalive timer has expired (step 600). If a keepalive timer has not expired, the process returns to step 600. In these examples, the keepalive timer is one of a set of timers for a set of connections to the same client machine. When the timer expires, a connection from the set of connections is selected (step 602). The connection may be selected using any of a number of different policies, such as a round robin scheme in which a different connection is selected each time a keepalive packet is to be sent.

Thereafter, a keepalive packet is generated (step 604). This keepalive packet is then sent over the selected connection (step 606). The process waits for a period of time for a response to the keepalive packet (step 608). A determination is then made as to whether a response has been received (step 610). If a response has not been received, the process determines whether to retry sending the keepalive packet (step 612). If the keepalive packet is to be resent, the process then returns to step 606 as described above. Otherwise, the connection is assumed to have failed. In these examples, all of the connections are closed in such a situation (step 614) with the process terminating thereafter.

With reference again to step 610, if a response is received, a determination is made as to whether the response received is an acknowledgement to the keepalive packet (step 616). If the response is an acknowledgement, then all of the timers for all of the connections to the client machine are reset (step 618) with the process terminating thereafter. Other responses that may be received include a RST response that indicates that the machine has been reset or powered off previously. If, in step 616, some other response other than acknowledgment (ACK) or data (such as FIN which closes a connection) is received, the process proceeds to step 614 as previously described.

Additionally, if a RST response is received, the connection over which the response is received may be terminated while the other connections remain. Alternatively, all of the connections may be terminated in response to receiving a RST response.

Figure 7:
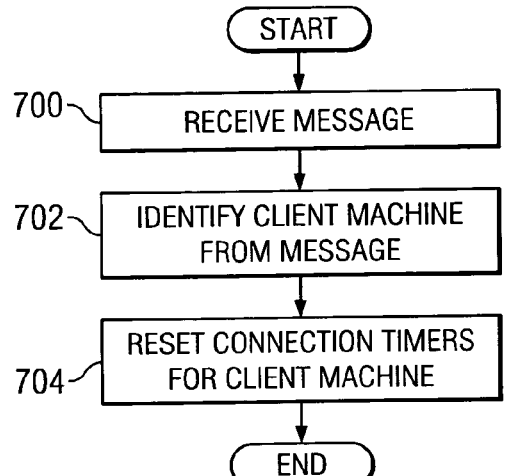
FIG. 7 is a flowchart of a process for resetting connection timers in accordance with a preferred embodiment of the present invention.

Turning next to FIG. 7, a flowchart of a process for resetting connection timers is depicted in accordance with a preferred embodiment of the present invention. The process illustrated in FIG. 7 may be implemented in a connection process, such as connection process 510 in FIG. 5.

The process begins by receiving a message (step 700). A client machine is identified from the message (step 702). For example, the message may be an acknowledge message. The connection timers for connections associated with the client machine are reset (step 704) with the process terminating thereafter.

Figure 8:
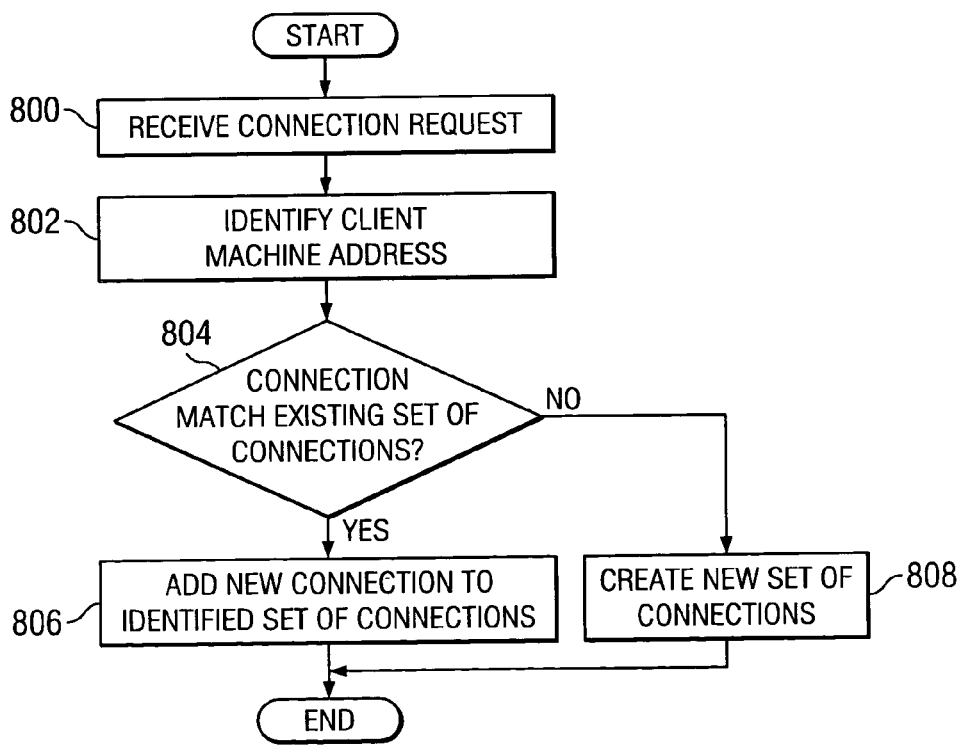
FIG. 8 is a flowchart of a process for identifying connections belonging to a client machine in accordance with a preferred embodiment of the present invention.

Turning now to FIG. 8, a flowchart of a process for identifying connections belonging to a client machine is depicted in accordance with a preferred embodiment of the present invention. The process illustrated in FIG. 8 may be implemented in a connection process, such as connection process 510 in FIG. 5.

The process begins by receiving a connection request (step 800). Thereafter, the client machine address is identified from the connection request (step 802) which contains the IP address. Thereafter, a determination is made as to whether the address matches an address for an existing set of connections (step 804). If this identified client machine address matches an address for an existing set of connections, the new connection for the request is added to the identified set of connections (step 806) with the process terminating thereafter. In this manner, timers for this new connection are managed in conjunction with the timers for the other connections.

With reference again to step 804, if a match does not exist, then a new set of connections is created (step 808) with the process terminating thereafter. This new set of connections has only the single new connection at this time. If another connection request is received with the same client machine IP address, then that new connection may be added to this set. In these examples, the information for this set of connections is maintained solely for the purpose of efficient management of keepalive information. The connection information is kept in protocol control blocks (PCBs) which include source and destination IP addresses among other attributes. These addresses are used to identify connections between the same machine pairs.

Thus, the present invention provides an improved method, apparatus, and computer instructions for managing the transmission of keepalive packets over a network. The mechanism of the present invention identifies multiple connections between two data processing systems. A keepalive packet is sent for one of the connections between the set of connections. When a response is received, all of the timers for all of the connections between those systems are reset. In this manner, the number of keepalive packets sent between two data processing systems is reduced, also reducing congestion.

Further, with respect to a server, a server may maintain thousands of connections with different client machines. With this mechanism, the number of keepalive packets may be reduced to the number of client machines actually accessing the server machine. Also, the mechanism of the present invention also uses any message received on any one of the connections to reset the keepalive timers.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted examples illustrate the processes of the present invention with respect to a client/server system, the mechanism of the present invention also may be applied to other types of systems, such as a peer-to-peer system. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a server data processing system for managing keepalive transmissions using a plurality of keepalive timers, wherein the server data processing system has a plurality of connections to a client data processing system, the method comprising:

responsive to expiration of one of the plurality of keepalive timers, sending a keepalive packet to the client data processing system over a particular connection within the plurality of connections to the client data processing system, wherein the keepalive packet pertains to keeping alive the particular connection within the plurality of connections; and responsive to receiving a selected response to the keepalive packet from the client data processing system, resetting the plurality of keepalive timers within the server data processing system, with each one of the plurality of keepalive timers being associated with a respective given one of the plurality of connections, wherein transmissions of keepalive packets are reduced to both the keepalive packet and the selected response, wherein the selected response keeps alive each of the plurality of connections to the client data processing system by the resetting of the plurality of keepalive timers, and wherein the plurality of keepalive timers that are reset responsive to the receiving of the selected response are identified by the server data processing system based upon an internet protocol (IP) address used during initial establishment of the particular connection between the server data processing system and the client data processing system.

2. The method of claim 1 further comprising:
responsive to receiving data over any of the plurality of connections, resetting timers for each of the plurality of connections.

3. The method of claim 1 further comprising:
responsive to receiving a reset message over the particular connection, terminating all of the plurality of connections.

4. The method of claim 1 further comprising:
responsive to receiving a reset message over the particular connection, only terminating the particular connection.

5. The method of claim 1, wherein the selected response is an acknowledgement of the keepalive packet.

6. The method of claim 1 further comprising:
responsive to receiving a message unassociated with the keepalive packet, resetting the timers for each of the plurality of connections.

7. The method of claim 1, wherein the method is implemented in a transport layer of a TCP/IP stack.

8. The method of claim 1, wherein the particular connection is selected using a policy, wherein the policy selects the particular connection using a round robin mechanism.

* * * * *